United States Patent [19]

Homan et al.

[11] 4,070,329
[45] Jan. 24, 1978

[54] SILOXANE ELASTOMER PREPARED FROM MERCAPTOORG ANOPOLYSILOXANES

[75] Inventors: Gary R. Homan; Chi-Long Lee, both of Midland, Mich.

[73] Assignee: Dow Corning Corporation, Midland, Mich.

[21] Appl. No.: 756,294

[22] Filed: Jan. 3, 1977

[51] Int. Cl.$^2$ .............................................. C08L 83/08
[52] U.S. Cl. ........................... 260/37 SB; 260/46.5 E; 260/46.5 G
[58] Field of Search .......... 260/37 SB, 46.5 G, 46.5 E

[56] References Cited

U.S. PATENT DOCUMENTS

| 3,382,196 | 5/1968 | Gowdy et al. | 260/46.5 E X |
| 3,873,499 | 3/1975 | Michael et al. | 260/46.5 G X |
| 3,925,331 | 12/1975 | Ely | 260/46.5 E X |

Primary Examiner—Lewis T. Jacobs
Attorney, Agent, or Firm—Roger H. Borrousch

[57] ABSTRACT

Mixing mercaptoorganopolysiloxanes, organic peroxide and optionally a filler provides a composition which cures to an elastomer either at room temperature or by heating. The elastomers have tack free surfaces and are useful as sealants and rubber articles.

2 Claims, No Drawings

SILOXANE ELASTOMER PREPARED FROM MERCAPTOORG ANOPOLYSILOXANES

BACKGROUND OF THE INVENTION

Field of the Invention

This invention relates to elastomers prepared from mercaptoorganopolysiloxanes.

Description of the Prior Art

Compositions containing mercapto functional siloxanes and aliphatically unsaturated organosiloxanes have been described in the prior art, such as in U.S. Pat. No. 3,816,282, in German Patent Publication (OLS) Number 2,008,426 and by George A. Gant in U.S. pat application Ser. No. 401,791, filed Sept. 28, 1973, entitled "UV Curable Compositions" and assigned to the same assignee as the present application. Other mercapto functional silanes and siloxanes have been described as priming agents, corrosion resistant coatings, such as for silver, and for surface treatments of various substrates. However, mercaptoorganopolysiloxanes have not been suggested as elastomer forming materials by themselves.

SUMMARY OF THE INVENTION

This invention relates to compositions which are curable to elastomers at room temperature and with heat where the compositions comprise a mercaptoorganopolysiloxane having no more than 10 mol percent —SH containing siloxane units and at least two sulfur atoms per molecule and at least 10 siloxane units per molecule, an organic peroxide and optionally a filler.

The compositions can be used as sealants which cure with non-tacky surfaces and which do not have some of the inhibitions of conventional peroxide cured silicone elastomers or the compositions which are cured with SiH containing siloxanes and platinum catalyst.

DESCRIPTION OF THE INVENTION

This invention relates to a composition curable to an elastomer comprising a material prepared by mixing (A) a mercaptoorganopolysiloxane consisting essentially of a combination of units selected from dimethylsiloxane units, trimethylsiloxane units, units of the formula

units of the formula

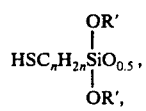

units of the formula

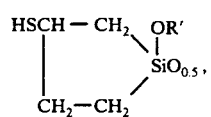

units of the formula

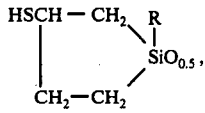

units of the formula

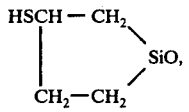

and units of the formula

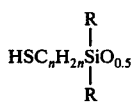

wherein R is a monovalent radical selected from the group consisting of alkyl radicals of from 1 to 3 carbon atoms inclusive and phenyl radicals, R' is methyl or ethyl and $n$ has a value of from 1 to 4 inclusive, there being in said mercaptoorganopolysiloxane an average of at least two sulfur containing siloxane units per molecule and no more than 10 mol percent —SH containing siloxane units based on the total number of siloxane units in the mercaptoorganopolysiloxane, there being at least 10 siloxane units per molecule in said mercaptoorganopolysiloxane, (B) an organic peroxide in an amount of from 1 to 6 parts by weight based on 100 parts by weight of (A), and (C) a filler in an amount of from 0 to 100 parts by weight per 100 parts by weight of (A).

The compositions of the present invention are prepared by mixing the ingredients (A), (B) and (C). The resulting mixtures undergo some reaction as soon as they are mixed, but have a reasonable pot life to be useful. Inasmuch as, crosslinking reaction beings upon mixing, the combination of (A), (B) and (C) should not be prepared too far in advance of the time cure is desired. Thus, one should determine the pot life by using small samples for each composition prior to compounding large batches of the compositions defined herein. The pot life can range from a few hours up to several weeks at room temperature. For purposes of storage, the compositions of this invention are two component or two package compositions. One can combine (A) and optionally (C) for one package and (B) as a second package. Various combinations can be used for purposes of storage, however, it is cautioned that the combination of (A) and (B) may result in gelation of that mixture on storage.

Preferably, (A), (B) and (C) are mixed at a temperature below 50° C. so that one does not activate the organic peroxide prematurally and cause gelation or curing during the mixing procedure.

After (A), (B) and (C) are mixed, the composition can cure at room temperature, above 20° C., however, compositions containing dialkyl peroxides are best cured by heating. Compositions are best cured in the presence of oxygen gas, such as air.

The type of mixing procedure is not critical as long as it does not generate excessive heating. For high viscosity compositions, such as those containing gums or high filler loadings, a two-roll mill can be used for mixing but is preferably cooled, such as by using the internal water cooled type mill. Also the composition can be combined and mixed by using a multi-feed extruder wherein two or more components can be fed into a mixer and the composition is extruded from the apparatus. The resulting extruded article can be then left to cure at room temperature or it can be heated to accelerate the cure.

The mercaptoorganopolysiloxanes of (A) contain combinations of two or more of the following units: dimethylsiloxane units, trimethylsiloxane units, and units of the formulae

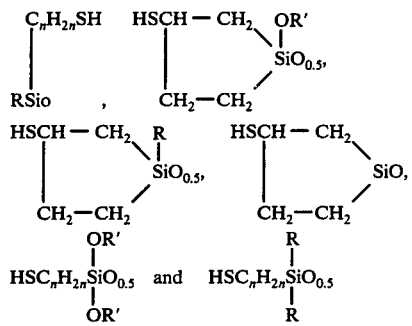

where R is an alkyl of 1 to 3 carbon atoms including methyl, ethyl and propyl, or phenyl, R' is methyl or ethyl and $n$ is 1 to 4 inclusive, preferably $n$ is 3 and R and R' are methyl. The mercaptoorganopolysiloxanes for use in the present invention are those which have at least two sulfur atoms per molecule and no more than 8 mol percent —SH containing siloxane units based on the number of siloxane units in the mercaptoorganopolysiloxane, and at least 10 siloxane units per molecule. Preferably, the mercaptoorganopolysiloxanes have more than 20 siloxane units per molecule and no more than 3.5 weight percent —SH group and the most preferred are those with no more than 2.2 weight percent —SH group. The mercaptoorganopolysiloxanes are known in the art. The silacyclopentane mercapto siloxanes can be prepared by the method defined in U.S. Pat. No. 3,655,713 which is hereby incorporated by reference to show the silacyclopentane mercapto siloxanes and their preparation. The mercaptoorganosiloxanes which contain endblocking units of the formula

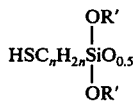

can be prepared by reacting a hydroxyl endblocked polydimethylsiloxane and a mercaptoalkyl trialkoxysilane of the formula

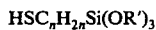

in the presence of solid potassium hydroxide or potassium silanolate catalysts. The potassium silanolate catalyst is preferred for the higher viscosity polydimethylsiloxanes. The mercaptoalkyltrialkoxysilane is preferably used in excess of about 10 weight percent over stoichiometric amounts. The resulting product is essentially a polydimethylsiloxane endblocked with the units of the formula

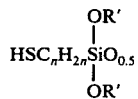

but there may be some small amounts of units wherein two SiOH groups have reacted with one mercaptoalkyltrialkoxysilane molecule, but these amounts are small enough that the character of the endblocked polydimethylsiloxane is not noticeably altered.

The organic peroxide of (B) can be any of the conventional organic peroxides, such as 2,4-dichlorobenzoyl peroxide, tertiary-butyl perbenzoate, benzoyl peroxide, di-tertiary-butyl peroxide, tertiary-butyl peroctoate, dicumyl peroxide, para-menthane hydroperoxide, tertiary-butyl hydroperoxide, cumene hydroperoxide and 2,5-bis(tertiary-butylperoxy)-2,5-dimethylhexane.

Fillers are preferably used in the compositions of this invention, but are not required. The fillers can be both treated and untreated reinforcing fillers, such as fume silica and fume silica having triorganosiloxy groups, such as trimethylsiloxy groups on the surface, carbon black or precipitated silica, and extending fillers such as crushed or ground quartz, diatomaceous earth, and calcium carbonate.

The compositions of the present invention are made by mixing (A) and (B) in weight ratios sufficient enough to provide from 1 to 6 parts by weight of organic peroxide per 100 parts by weight of (A). The compositions preferably contain filler up to 100 parts by weight per 100 parts by weight of (A).

The compositions of this invention cure to elastomers either at room temperature or with heating, such as hot air vulcanization depending on the type of organic peroxide used. The best organic peroxides for curing the compositions at room temperature are the aromatic peroxides, such as 2,4-dichlorobenzoyl peroxide, tertiarybutyl perbenzoate and benzoyl peroxide, the peroxy esters, such as tertiary-butyl peroctoate, and the hydroperoxides such as tertiary-butyl hydroperoxide, cumene hydroperoxide and para-menthane hydroperoxide. Any of the organic peroxides can be used in compositions which are to be heat cured. The resulting elastomer has a dry or non-tacky surface. Air inhibition which is observed with conventional non-mercapto-containing peroxide cured silicone rubber composition is not observed and the inhibition by various materials such as sulfur and phosphorus in the platinum catalyzed compositions containing aliphatic unsaturated siloxanes and SiH containing siloxanes, is not observed.

The following examples are presented for illustrative purposes and should not be construed as limiting the invention which is properly delineated in the claims.

EXAMPLE 1

A sealant composition was prepared by mixing 25 g. of a polydimethylsiloxane having endblocks of the formula

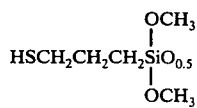

and 2.1 weight percent —SH group, 12.5 g. of five micron crushed quartz filler and 2.5 g. of a peroxide mixture having 35 weight percent 2,4-dichlorobenzoyl peroxide, and the remainder being dibutylphthalate and crushed quartz filler. The sealant composition was poured into a 3.175 mm. chase and heated to 150° C. for 1 hour being exposed to the atmosphere. An elastomer with a tack free surface was obtained.

EXAMPLE 2

A sealant composition was prepared by mixing 40 g. of a trimethylsiloxy endblocked polydiorganosiloxane composed of dimethylsiloxane units and methyl(gamma-mercaptopropyl)siloxane units and having 2.08 weight percent —SH groups and a viscosity at 25° C. of $2.208 \times 10^{-3}$ square meters per second and 6 g. of the peroxide mixture defined in Example 1. The sealant composition completely cured to a rubber with a dry surface between 3 and 7 days at room temperature.

EXAMPLE 3

A sealant composition was prepared by mixing 100 parts by weight of the mercapto functional siloxane defined in Example 2, 20 parts by weight of 5 micron crushed quartz filler, and 7.5 parts by weight of a peroxide mixture of 50 weight percent 2,4-dichlorobenzoyl peroxide and 50 weight percent of dibutylphthalate and trimethylsiloxy endblocked polydimethylsiloxane. The resulting mixture cured to an elastomer with a dry surface in less than 24 hours at room temperature, in less than 5 minutes at 150° C. under hot air vulcanization conditions and in less than 10 seconds at 175° C. in a press.

EXAMPLE 4

Compositions were prepared by mixing 100 parts by weight of a trimethylsiloxy endblocked polydiorganosiloxane having dimethylsiloxane units and methyl(gamma-mercaptopropyl)siloxane units in the mol ratio as defined in the Table and having the average number of siloxane units as defined in the Table, 30 parts by weight of a fume silica filler having the surface treated with trimethylsiloxy groups and 7.5 parts by weight of the peroxide mixture defined in Example 3. The resulting mixture was press cured at 175° C. for 5 minutes and then the durometer was determined by ASTM-D-2240 with the results in Shore A, the tensile strength, elongation and modulus at 100 percent elongation were determined by ASTM-D-412 and were as shown in the Table.

Table

| | Mercaptosiloxane Polymer | | | | | | |
|---|---|---|---|---|---|---|---|
| Composition | Mol % $(CH_3)_2SiO$ | Mol % $(HSCH_2CH_2CH_2)(CH_3)SiO$ | No. of Siloxane Units Per Molecule | Durometer Shore A | Tensile Strength kPa* | Elongation % | Modulus 100%, kPa |
| 1 | 95 | 5 | 250 | 12 | 414 | 190 | 207 |
| 2 | 99 | 1 | 500 | 16 | 2068 | 405 | 345 |
| 3 | 99.5 | 0.5 | 800 | 12 | 3447 | 680 | 207 |

*kPa is kilopascals.

That which is claimed is:

1. A composition curable to an elastomer comprising a material prepared by mixing
    A. a mercaptoorganopolysiloxane consisting essentially of a combination of units selected from dimethylsiloxane units, trimethylsiloxane units, units of the formula

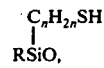

units of the formula

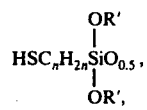

units of the formula

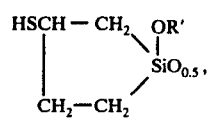

units of the formula

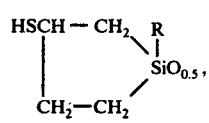

units of the formula

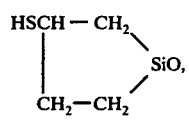

and units of the formula

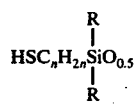

wherein R is a monovalent radical selected from the group consisting of alkyl radicals of from 1 to 3 carbon atoms inclusive and phenyl radicals, R' is methyl or ethyl and n has a value of from 1 to 4 inclusive, there being in said mercaptoorganopolysiloxane an average of at least two sulfur containing siloxane units per molecule and no more than 10 mol percent —SH containing siloxane units based on the total number of siloxane units in the mercaptoorganopolysiloxane, there being at least 10 siloxane units per molecule in said mercaptoorganopolysiloxane,
    B. an organic peroxide in an amount of from 1 to 6 parts by weight based on 100 parts by weight of (A), and
    C. a filler in an amount of from 0 to 100 parts by weight per 100 parts by weight of (A).

2. The composition in accordance with claim 1 in which the organic peroxide is selected from an aromatic peroxide, a peroxyester and a hydroperoxide.

* * * * *

UNITED STATES PATENT AND TRADEMARK OFFICE
CERTIFICATE OF CORRECTION

PATENT NO. : 4,070,329
DATED : January 24, 1978
INVENTOR(S) : Gary R. Homan and Chi-Long Lee It is certified that error appears in the above-identified patent and that said Letters Patent are hereby corrected as shown below:

The title "SILOXANE ELASTOMER PREPARED FROM MERCAPTOORG ANOPOLYSILOXANES" should read "SILOXANE ELASTOMER PREPARED FROM MERCAPTOORGANOPOLYSILOXANES"

Col. 1, line 16 - the word "pat" should read "Pat."

Column 3, line 32 - the number "8" should read "10"

Signed and Sealed this

Nineteenth Day of January 1982

[SEAL]

Attest:

GERALD J. MOSSINGHOFF

Attesting Officer       Commissioner of Patents and Trademarks